(No Model.)

F. FALK.
VEHICLE AXLE BEARING.

No. 540,908. Patented June 11, 1895.

Witnesses:
J. B. McGirr.
A. R. Appleman

Inventor:
Franz Falk
by Evert Appleman
Attys

UNITED STATES PATENT OFFICE.

FRANZ FALK, OF LAREDO, TEXAS, ASSIGNOR OF ONE-HALF TO A. L. McLANE, OF SAME PLACE.

VEHICLE-AXLE BEARING.

SPECIFICATION forming part of Letters Patent No. 540,908, dated June 11, 1895.

Application filed January 9, 1895. Serial No. 534,366. (No model.)

*To all whom it may concern:*

Be it known that I, FRANZ FALK, a citizen of the United States of America, residing at Laredo, in the county of Webb and State of Texas, have invented certain new and useful Improvements in Axles and Wheels, of which the following is a specification, reference being had to the accompanying drawings.

The object of this invention is to provide a vehicle axle and wheel which will reduce the friction caused by the running of the same and at the same time make a strong and durable combination.

A further object of the invention is to arrange the parts in such a manner as to make them dust proof and to provide means whereby the oil may be admitted to the bearings without removing the wheel or exposing said bearings, thus preventing accumulations of dust or other foreign substance.

With these and other objects in view the invention consists in the novel details of construction, arrangement, and combination of parts to be hereinafter more fully set forth and claimed.

In describing the invention in detail reference is had to the accompanying drawings, forming part of the specification, wherein like numerals denote corresponding parts in the several views, in which—

Figure 1:
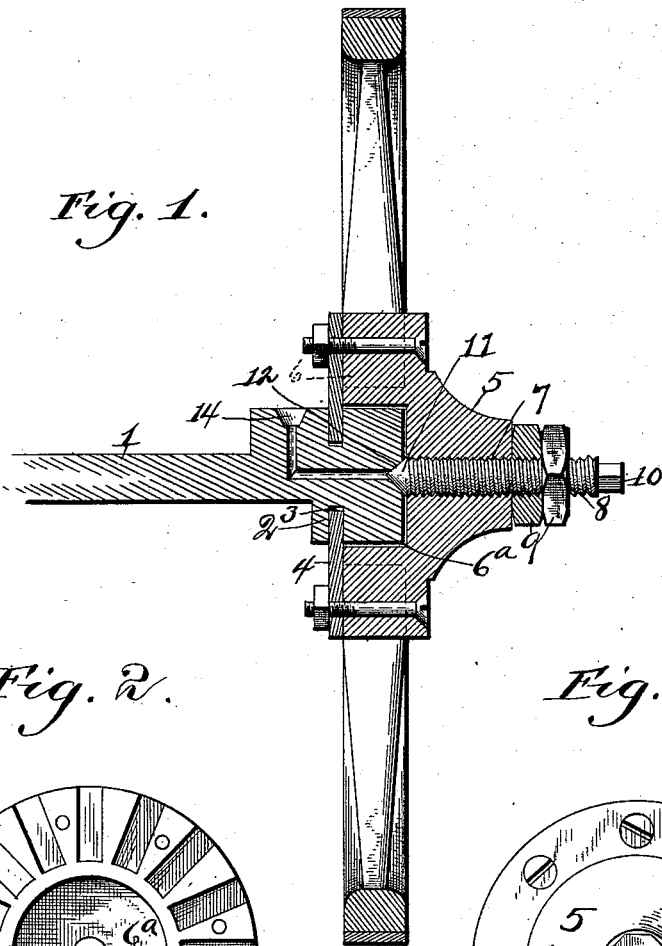
Figure 2:
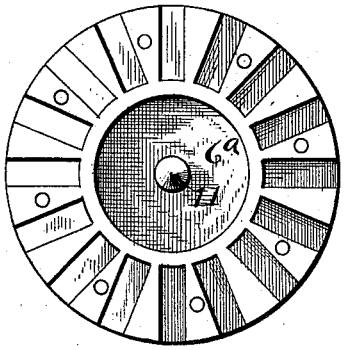
Figure 3:
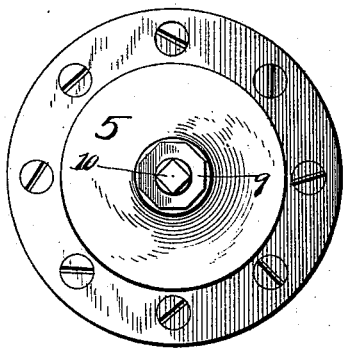

Figure 1 is a vertical cross-sectional view. Fig. 2 is a plan view of the inner side of the hub with the spokes omitted. Fig. 3 is a view of the external plan of the hub.

In the drawings 1 denotes an axle which is of ordinary construction, having an enlarged end 2 instead of the usual spindle. This enlarged end has an annular groove 3, which is designed to receive the plates 4, said plates being semi-circular and in size corresponding, when joined, with the size of the hub. The hub proper 5, consists of an iron or steel casing mortised to receive the tenons of the spokes 6, said spokes being of ordinary contruction. The hub is provided with a bore 6ª large enough to admit the end of the axle. Centrally of the hub and extending from the outside is arranged a screw-threaded aperture 7, communicating with the bore and designed to receive a steel pin 8, which is also screw-threaded to coincide with the screw-thread of the aperture and also to receive the binding nuts 9, 9 acting to securely hold the pin when properly adjusted. The outer end of this pin is squared as at 10, that it may be adjusted by the use of a wrench, while the inner end 11 is cone-shaped and fits in a depression or seat 12 of the enlarged end of the axle.

Centrally of the axle a longitudinal oil conduit is arranged which connects with the oil reservoir 14, arranged on the axle. It will thus be seen that the oil from the reservoir is conducted to the front of the enlarged portion of the axle where the pin revolves in its seat, thereby oiling the parts. It will be seen also that the oil is distributed from the center to the entire inside of the hub where all the friction occurs.

The pin 8 can be readily adjusted to take up lost motion, or if desired, can be withdrawn from its seat, in which event the entire strain would be brought to bear on the periphery of the enlarged end of the axle and the bore of the hub.

When the enlarged end of the axle is in place in the bore of the hub and the semi-circular plates are inserted in the groove and secured to the main section of the hub by the screws 15, the parts are joined in such a manner that the loss of a nut or the like will not be attended with the disastrous result so common with the spindle and nut in general use. Furthermore, the spokes are securely held in position and can be tightened in case they wear loose.

The objects and advantages of the invention will be apparent from the foregoing description, and it will be noted particularly that various changes may be made in the details of construction of the same without departing from the spirit of the invention.

Having fully described my invention, what I claim as new, and desire to secure by Letters Patent, is—

1. In a vehicle a hub consisting of a main front section having a central bore, a cone-shaped pin screw threaded in the bore, in combination with an axle having an enlarged end with a circumferential annular groove, and a recess in its face to receive the end of the pin, and semi-circular plates engaging the groove and secured to the main section of the hub, as and for the purpose described.

2. A vehicle wheel having a hub provided with a central bore to receive a screw threaded pin having a cone shaped end, in combination with an axle having an enlarged end, said end having a circumferential annular groove and a recess forming a seat for the cone shaped pin and means for securing the axle to the wheel as and for the purpose described.

In testimony whereof I affix my signature in presence of two witnesses.

FRANZ FALK.

Witnesses:
E. A. ATLEE,
J. F. MULLALLY.